(12) United States Patent
Bronson

(10) Patent No.: US 7,081,870 B2
(45) Date of Patent: Jul. 25, 2006

(54) WEARABLE DISPLAY AND METHOD OF DISPLAYING IMAGES USING A WEARABLE DISPLAY

(75) Inventor: Barry Bronson, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 807 days.

(21) Appl. No.: 09/851,340

(22) Filed: May 9, 2001

(65) Prior Publication Data

US 2002/0167461 A1 Nov. 14, 2002

(51) Int. Cl.
*G09G 5/00* (2006.01)

(52) U.S. Cl. .................. 345/7; 345/9; 345/80; 345/698

(58) Field of Classification Search ................ 345/7–9, 345/698, 80; 349/149–150
See application file for complete search history.

(56) References Cited

U.S. PATENT DOCUMENTS

| | | | |
|---|---|---|---|
| 4,028,725 A | 6/1977 | Lewis | 358/103 |
| 4,348,186 A | 9/1982 | Harvey et al. | 434/44 |
| 4,479,784 A | 10/1984 | Mallinson et al. | 434/43 |
| 4,484,230 A * | 11/1984 | Pugsley | 358/284 |
| 4,634,384 A | 1/1987 | Neves et al. | 434/44 |
| 5,071,209 A | 12/1991 | Chang et al. | 359/19 |
| 5,103,306 A | 4/1992 | Weiman et al. | 358/133 |
| 5,124,695 A * | 6/1992 | Green | 340/784 |
| 5,136,675 A | 8/1992 | Hodson | 385/116 |
| 5,320,534 A | 6/1994 | Thomas | 434/44 |
| 5,422,653 A | 6/1995 | Maguire, Jr. | 345/9 |
| 5,579,026 A | 11/1996 | Tabata | 345/8 |
| 5,670,970 A | 9/1997 | Yamazaki | 345/8 |
| 5,673,059 A | 9/1997 | Zavracky et al. | 345/8 |
| 5,726,670 A | 3/1998 | Tabata et al. | 345/7 |
| 5,751,272 A | 5/1998 | Silverbrook et al. | 345/149 |
| 5,757,424 A | 5/1998 | Frederick | 348/218 |
| 5,805,136 A | 9/1998 | Silverbrook et al. | 345/149 |
| 5,808,589 A | 9/1998 | Fergason | 345/8 |
| 5,808,594 A | 9/1998 | Tsuboyama et al. | 345/89 |
| 5,917,460 A | 6/1999 | Kodama | 345/8 |
| 6,101,038 A | 8/2000 | Hebert et al. | 359/618 |
| 6,115,007 A | 9/2000 | Yamazaki | 345/7 |
| 6,124,843 A | 9/2000 | Kodama | 345/145 |
| 6,124,954 A | 9/2000 | Popovich et al. | 359/13 |

(Continued)

FOREIGN PATENT DOCUMENTS

JP 09-220200 * 8/1997

OTHER PUBLICATIONS

"Eye, Vision and Visibility", www.arce.ukans.edu/book/eye/acuity.htm, pp. 1-11.

*Primary Examiner*—Richard Hjerpe
*Assistant Examiner*—Kimnhung Nguyen

(57) ABSTRACT

Images are displayed on a wearable display by generating an inner region display signal, and generating an outer region display signal using the inner region signal. The outer region display signal is generated by determining motion, brightness and color characteristics from the inner region display signal. The outer region is of substantially lower resolution than the inner region, and is outside the viewer's foveal field of view. The viewing experience is enhanced by the increase in the size of the image due to the presence of the outer region. Because the outer region is outside of the foveal field of view, the viewer of the image does not perceive the change in resolution of the outer region. An outer region may alternatively be created by distorting a source image.

22 Claims, 12 Drawing Sheets

U.S. PATENT DOCUMENTS

| | | | |
|---|---|---|---|
| 6,140,980 A | 10/2000 | Spitzer et al. | 345/8 |
| 6,529,331 B1 * | 3/2003 | Massof et al. | 359/630 |
| 6,614,448 B1 * | 9/2003 | Garlick et al. | 345/605 |
| 6,788,311 B1 * | 9/2004 | Ketrenos | 345/660 |
| 2002/0015052 A1 * | 2/2002 | Deering | 345/647 |
| 2002/0093521 A1 * | 7/2002 | Daly et al. | 345/698 |

* cited by examiner

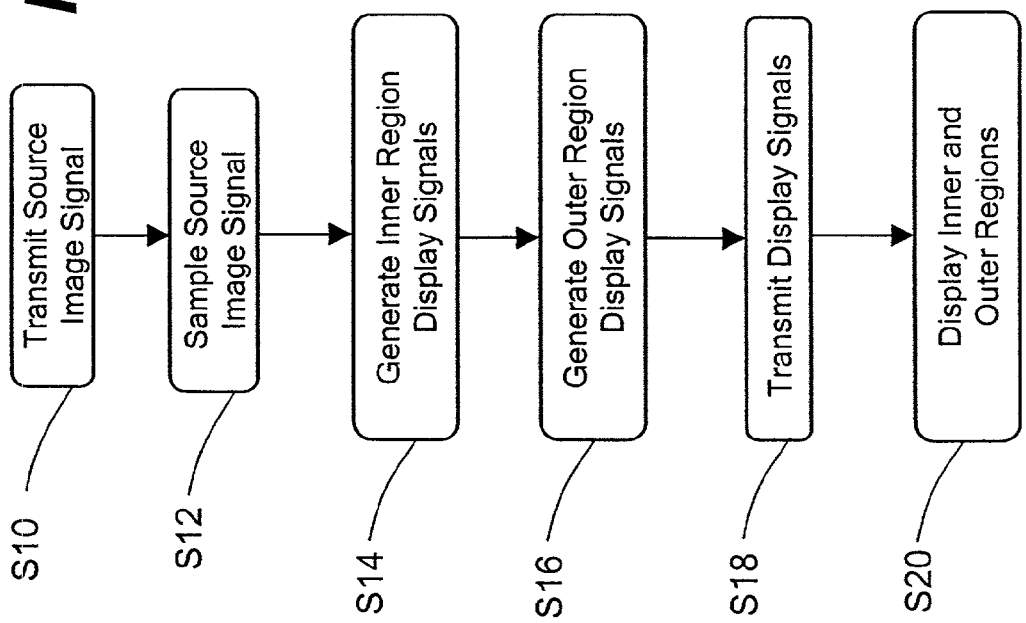

WEARABLE DISPLAY AND METHOD OF DISPLAYING IMAGES USING A WEARABLE DISPLAY

FIELD OF THE INVENTION

The present invention relates to a method and apparatus for displaying images. More particularly, the present invention relates to displaying images using wearable displays.

BACKGROUND OF THE INVENTION

Figure 1:
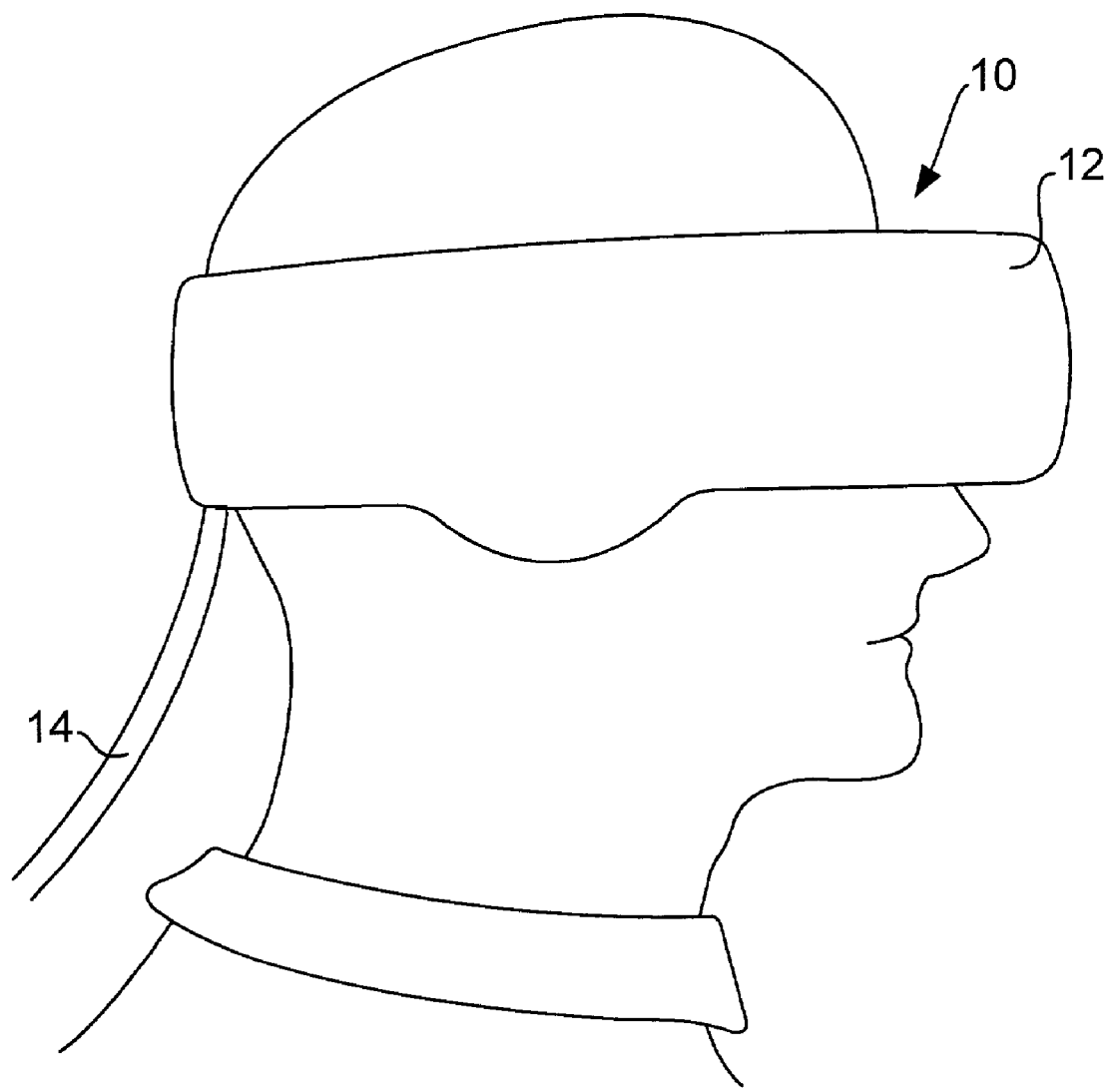
Figure 2:
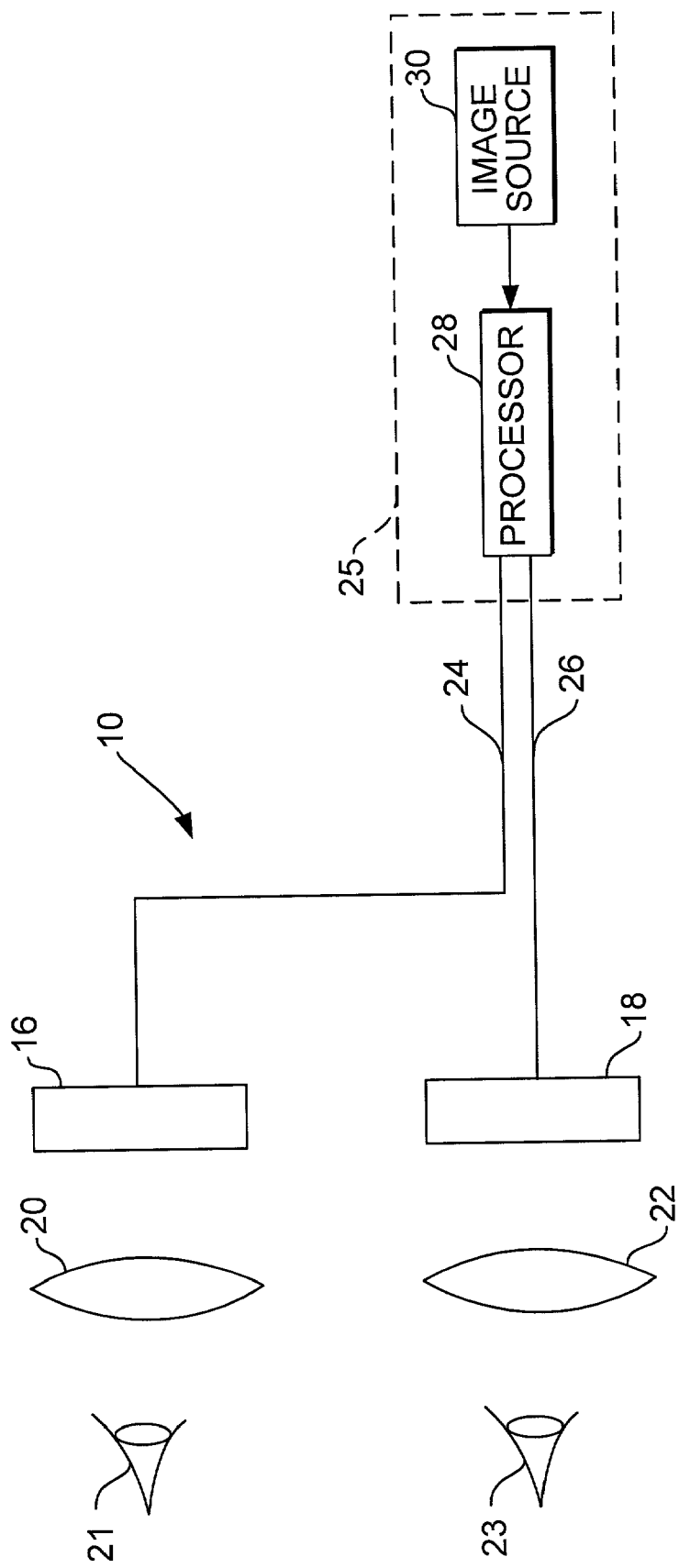

In general, apparatuses for displaying images are known. An example of an apparatus for displaying images to a user is a head-mounted display system. Head-mounted display systems can be generally referred to as "wearable displays," because they are supported by a user while in use. Conventional wearable display systems typically include a head-mounted portion, the head-mounted portion having image-generating devices for generating images viewable by the user. Wearable display systems convey visual information, such as data from sensing devices, programmed entertainment such as moving or still images, and computer generated information. The visual information may be accompanied by audio signals for reception by a user's ears. A conventional wearable display system 10 is illustrated by FIGS. 1 and 2.

The conventional wearable display system 10 includes a head-mounted portion 12, which includes right and left image displays 16, 18 and right and left eyepiece optics 20, 22, for displaying images to a user's eyes 21, 23. A controller 25 conveys image signals to the head-mounted portion 12 via a cable 14 having right and left lines 24, 26 for conveying image signals to the right and left image displays 16, 18, respectively. The controller 25 is comprised of an image source 30, which transmits image data to a processor 28, which then formats the data for transmission to the right and left image displays 16, 18.

Figure 3:
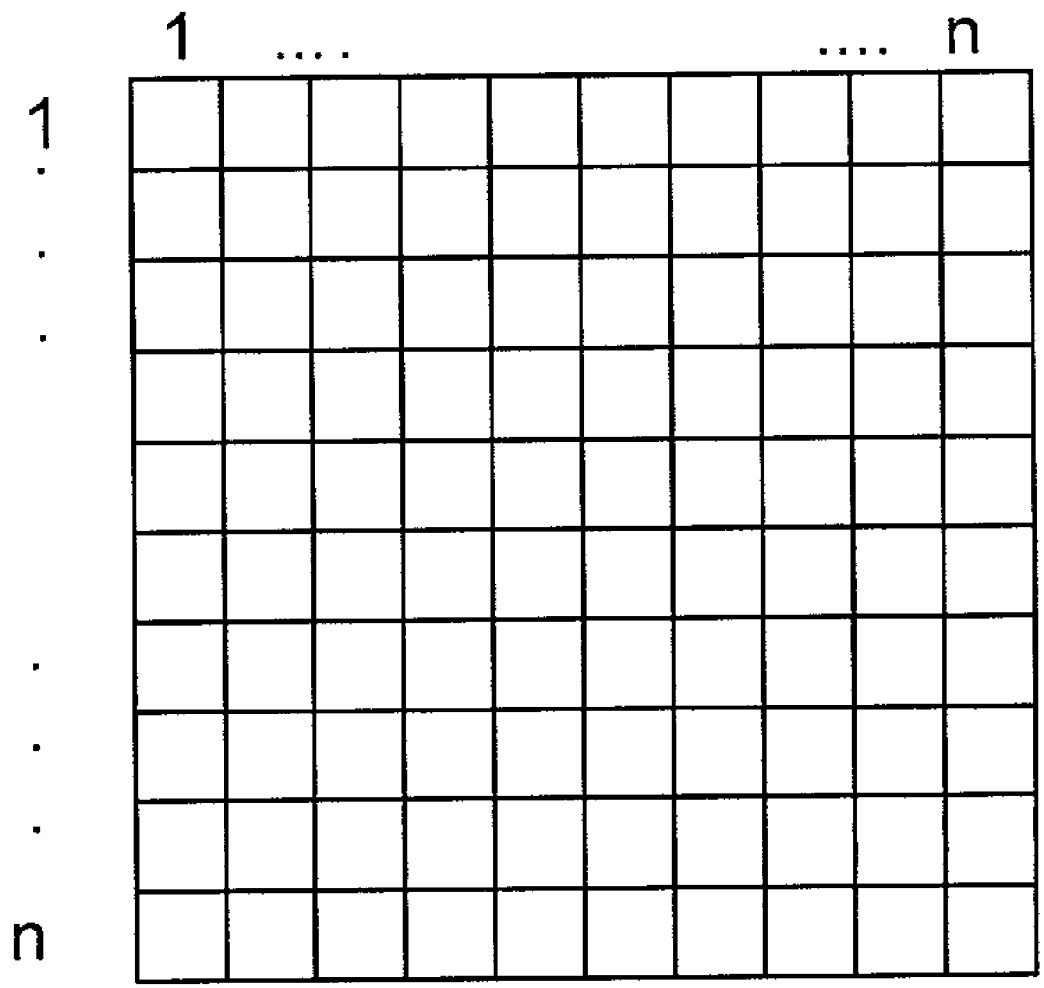

The right and left image displays 16, 18 are flat panel displays capable of displaying an n×n array of individual points of light, or "pixels." These types of matrix display devices are commonly referred to as "microdisplays." The term "microdisplay" describes devices such as liquid crystal displays (LCDs), light emitting displays (LEDs), and scanning devices using cathode ray tubes (CRT's) or laser diodes. FIG. 3 illustrates an n×n array of pixels of a typical microdisplay, with the size of individual pixel elements exaggerated for illustrative purposes. An n×n array such as the one illustrated by FIG. 3 is typically described in terms of its "resolution," which is measured as the number of pixels per unit area of the display. The n×n pixels illustrated in FIG. 3 are of uniform size. While this configuration is capable of generating a high resolution image, the uniform size of the pixels is inefficient, because the human eye cannot appreciate the relatively high degree of resolution along the edges of the conventional array. This phenomenon is illustrated by FIGS. 4 and 5.

Figure 4:
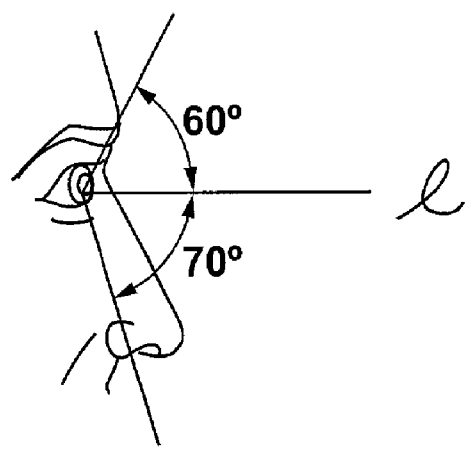
Figure 5:
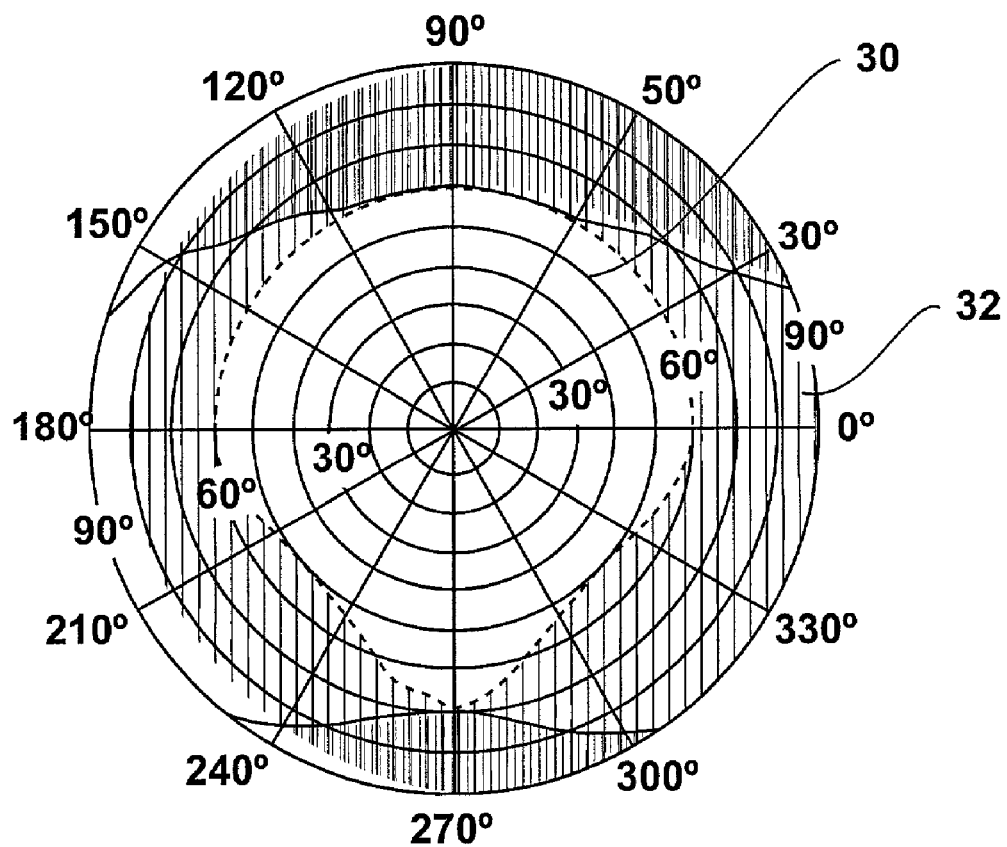

FIG. 4 illustrates a vertical range of vision diagram for a human viewer, the range of vision establishing a human's field of vision. FIG. 5 illustrates the regions of varying visual acuity for a human's left and right eyes while viewing an image together. The inner region 30 of the diagram is a region of relatively high visual acuity. The shaded outer region 32 in the diagram illustrates the portion of a person's field of vision that is of low acuity, but which is also very sensitive to changes in brightness and motion. The outer region 32 includes the peripheral vision. A similar diagram can be constructed for the regions of varying acuity as perceived by a single eye. As illustrated by FIG. 5, the acuity of the eyes decreases with increasing angular deviation (both horizontal and vertical) from the line of sight l. It is therefore undesirable to provide high resolution along the edges of an array, as in the wearable display system 10, because the cost of display devices increases with resolution, and high resolution at the edges of displays provides little viewing benefit to the user of the wearable display system 10. Further, the cost to store, process, and transfer very high resolution signals further increases the cost of the wearable display system 10.

One conventional approach to the above problem is the use of display devices having variable resolution. One such device is disclosed in U.S. Pat. No. 4,479,784 to Mallinson et al. Mallinson's device uses a bifurcated projection system to project an image onto a screen for viewing by a trainee. A region of high resolution imagery is projected onto a center portion of the screen by a foveal projection system, and a region of low resolution is projected by a peripheral projection system. While Mallinson's device accommodates the varying acuity of the user, his system would require large and complex optics and light levels to project into the user's far peripheral viewing region.

U.S. Pat. No. 5,071,209 to Chang et al. discloses a similar device, in which a processor creates images from pixels, with pixel size decreasing with increasing distance from the center of the image. To extend image features into the periphery, Chang's device would require a large and complex optical system to further extend the main microdisplay pixels into the user's far peripheral viewing region.

In U.S. Pat. No. 6,115,007, Yamazaki utilizes a liquid crystal flat panel display having pixels of varying width. Yamazaki, however, utilizes varying pixel width to account for distortion at the horizontal extremes of the viewer's vision. Yamazaki's device also requires complex control architecture to generate images on the flat panel display.

There is therefore a need for a method of displaying images on a wearable display and for wearable display that accommodate the varying acuity of the human eye, and that present a wide field of view to a user.

SUMMARY OF THE INVENTION

The present invention overcomes the shortcomings of the conventional art and may achieve other advantages not contemplated by the conventional art.

According to a first aspect of the invention, images are displayed using a wearable display by generating an inner region display signal, generating an outer region display signal using at least one of a motion, brightness or color characteristic from the inner region display signal, displaying an inner region of an image on a display using the inner region display signal, and displaying an outer region of the image on the display using the outer region display signal. The outer region is of substantially lower resolution than the inner region.

According to the first aspect, a display has an outer region of low resolution, which may lie outside of the eye's foveal field of view. The viewing experience is enhanced by the increase in the size of the image due to the presence of the outer region, and the low resolution does not detract from the viewing experience.

According to a second aspect of the invention, the field of view of a wearable display is increased by adjusting image signal data to increase the size of an image displayed by the wearable display. The image signal data is adjusted so that an image conveyed by the image signal data is distorted, or "stretched," to extend into an outer region of a display.

According to the second aspect, the size of the image in the user's field of view is increased by distorting the source image. The outer region of the source image may be selected so that it lies outside of the eyes' foveal field of view, so that the viewing experience is enhanced due to the increased size of the image.

According to a third aspect of the invention, a wearable display includes a display, a controller for obtaining image signal data from a source image signal and for generating a display signal. Optics are arranged in the wearable display so as to modify an image displayed by the display and to distort the image displayed by the display so that a field of view of the image is increased.

According to the third aspect, an outer, distorted region of an image may be selected so that it lies outside of the eyes' foveal field of view, so that the viewing experience is enhanced due to the increased size of the image presented by the optics.

Other aspects and advantages of aspects of the invention will be discussed with reference to the drawings figures and to the detailed description of the preferred embodiments.

BRIEF DESCRIPTION OF THE DRAWING FIGURES

Figure 6:
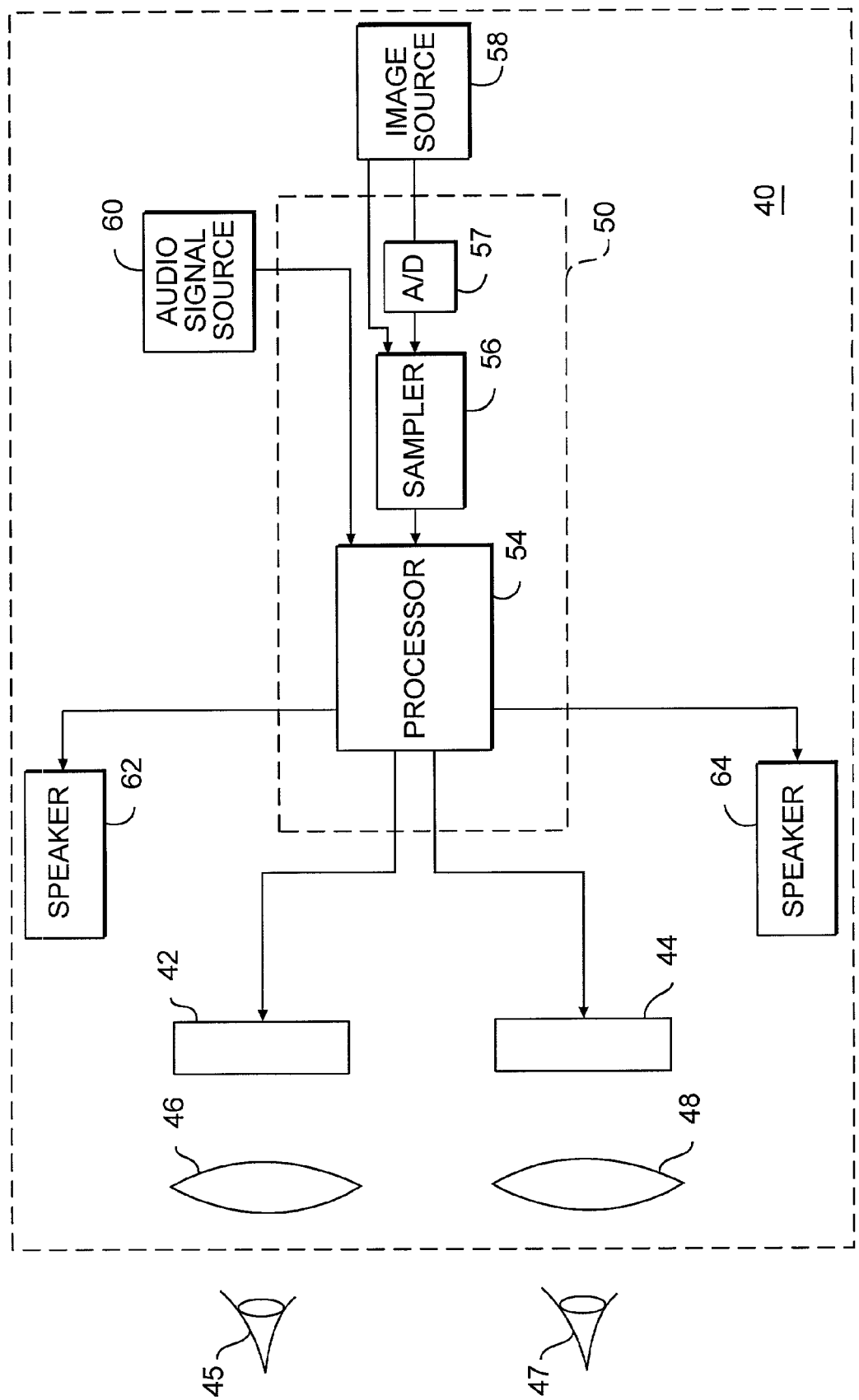
Figure 7:
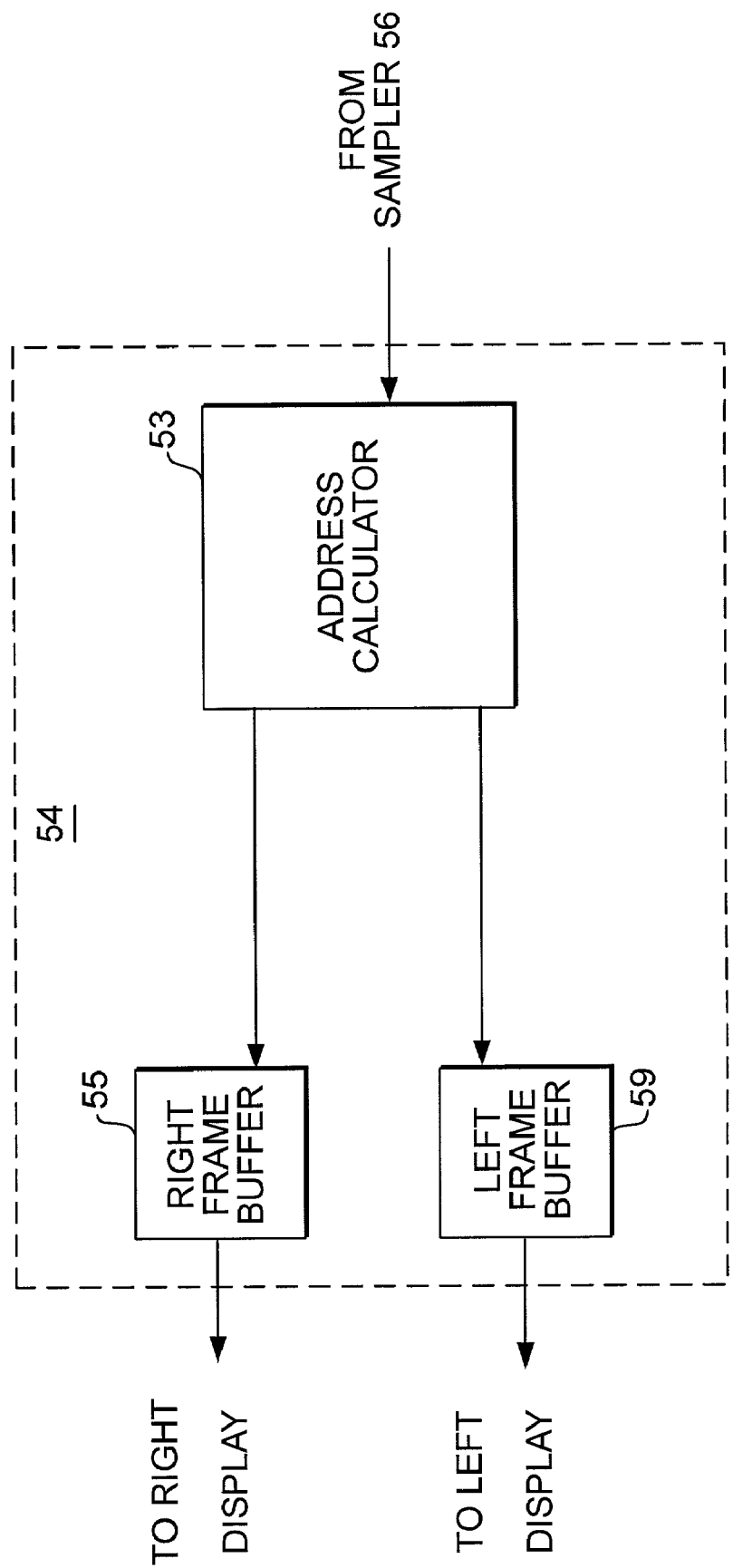
Figure 8:
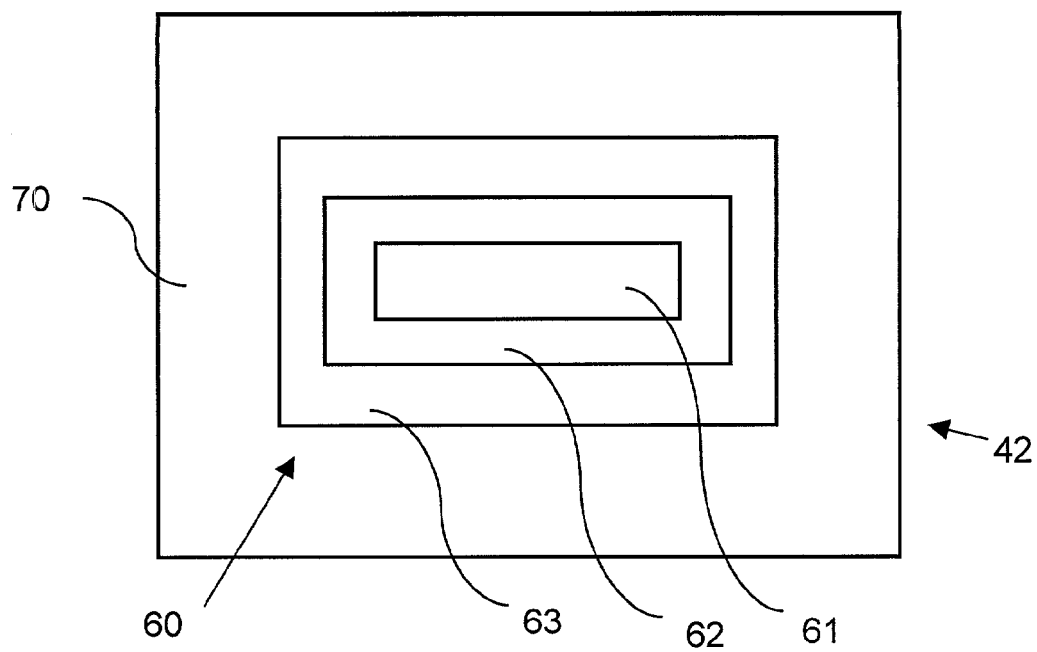
Figure 11:
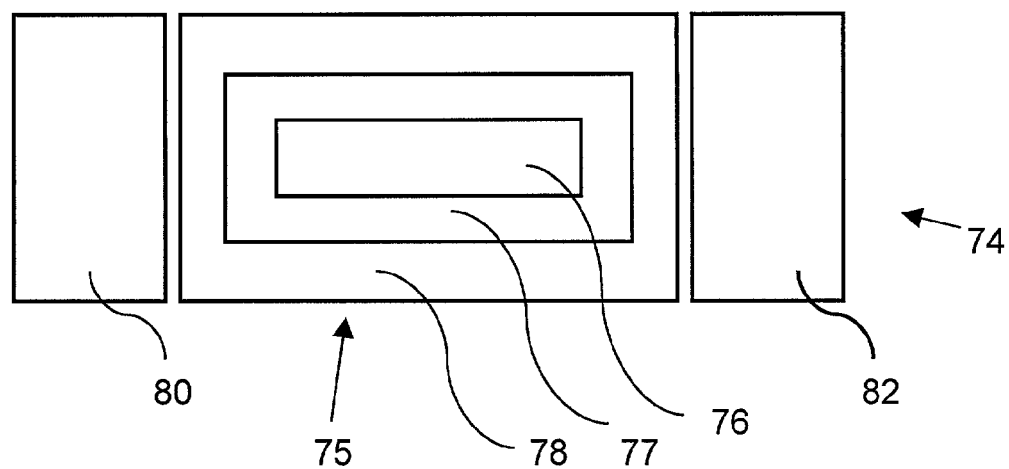
Figure 12:
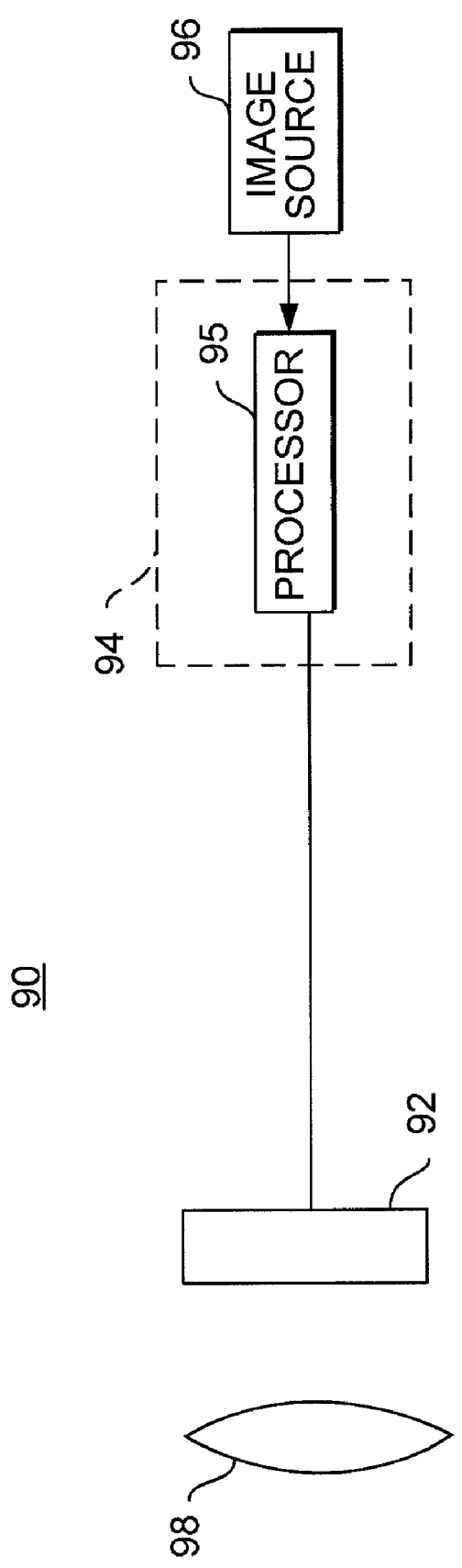
Figure 13:
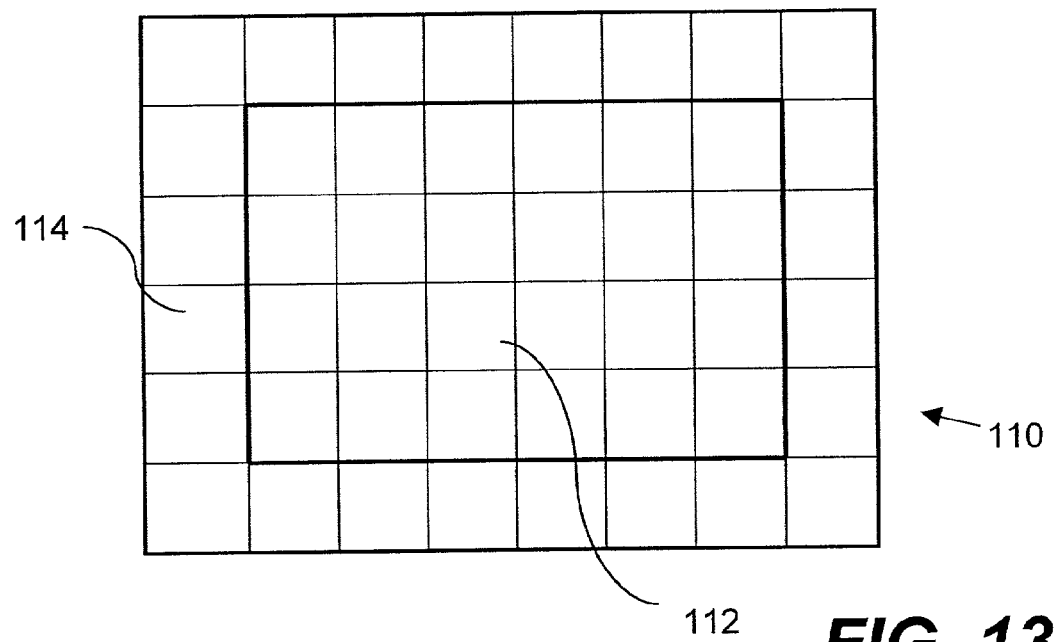
Figure 14:
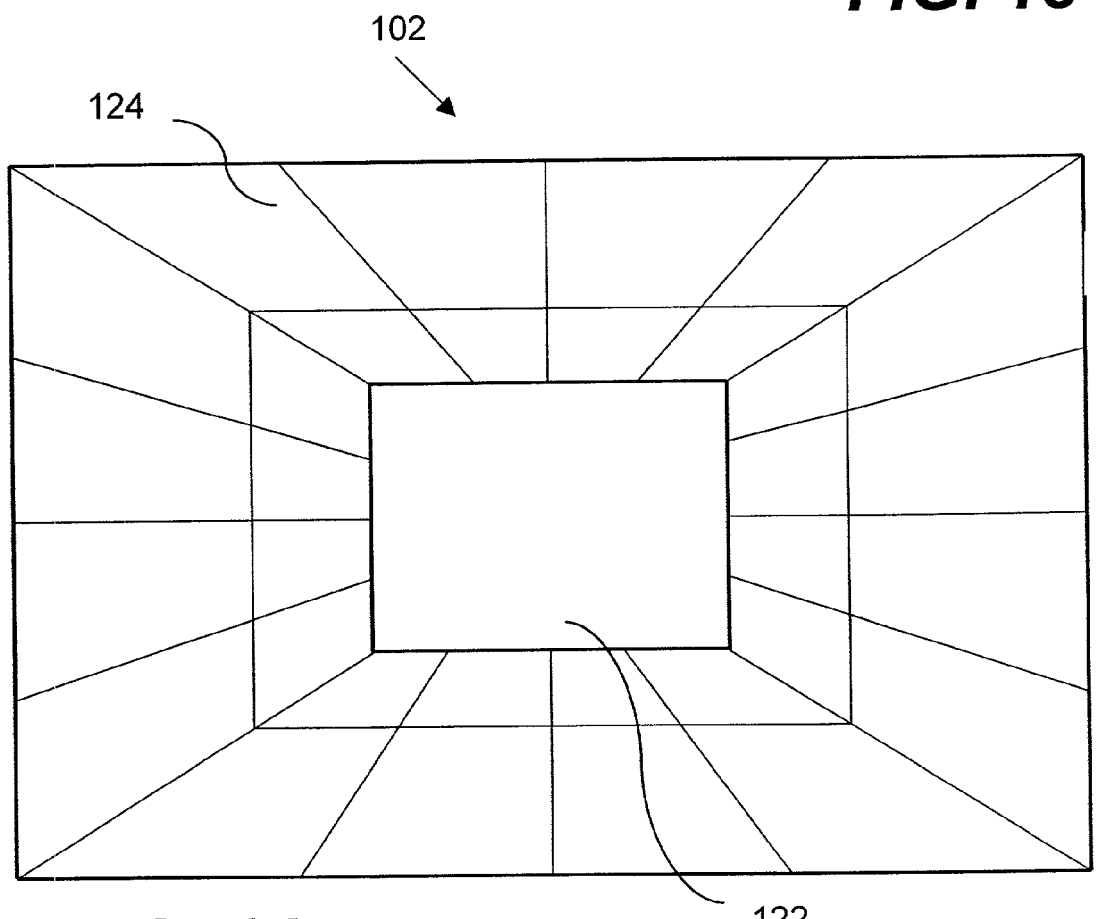
Figure 15:
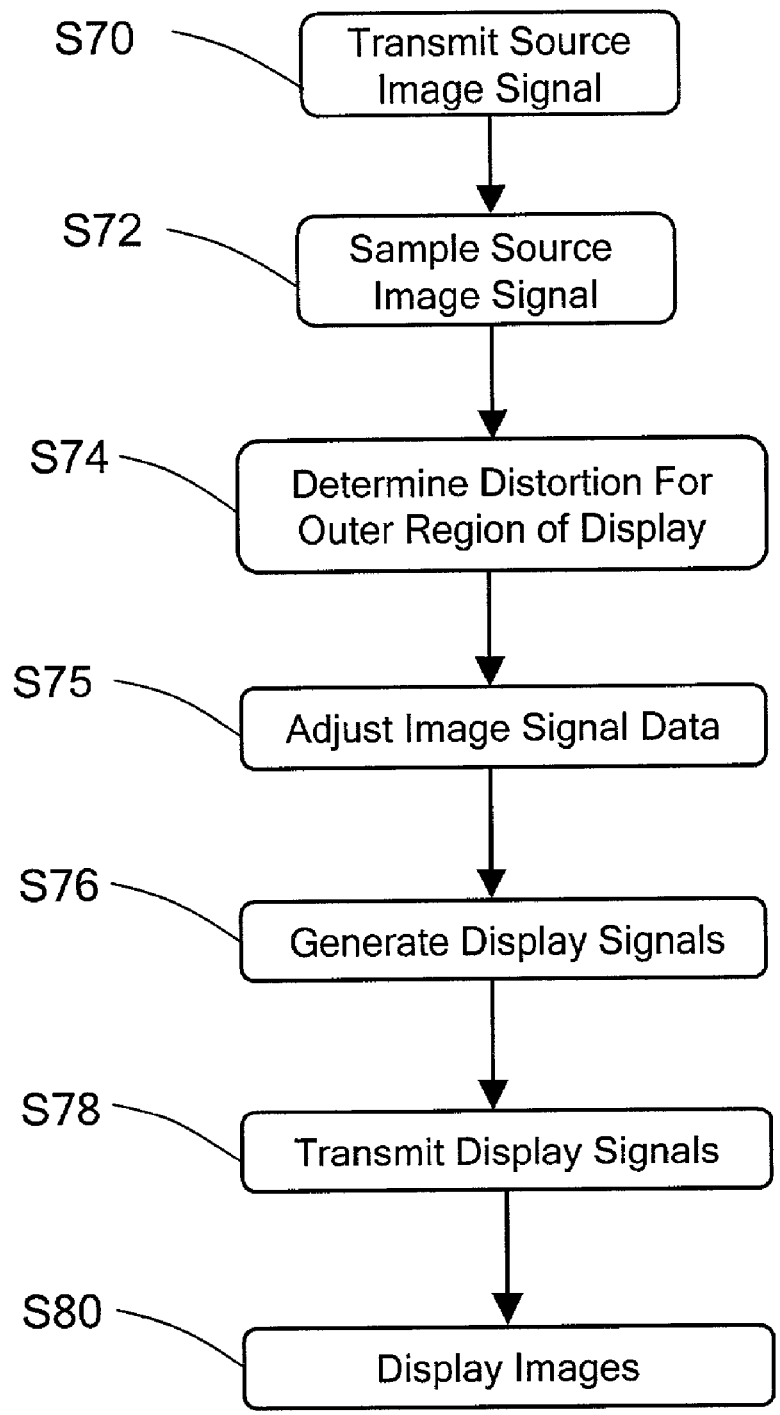
Figure 16:
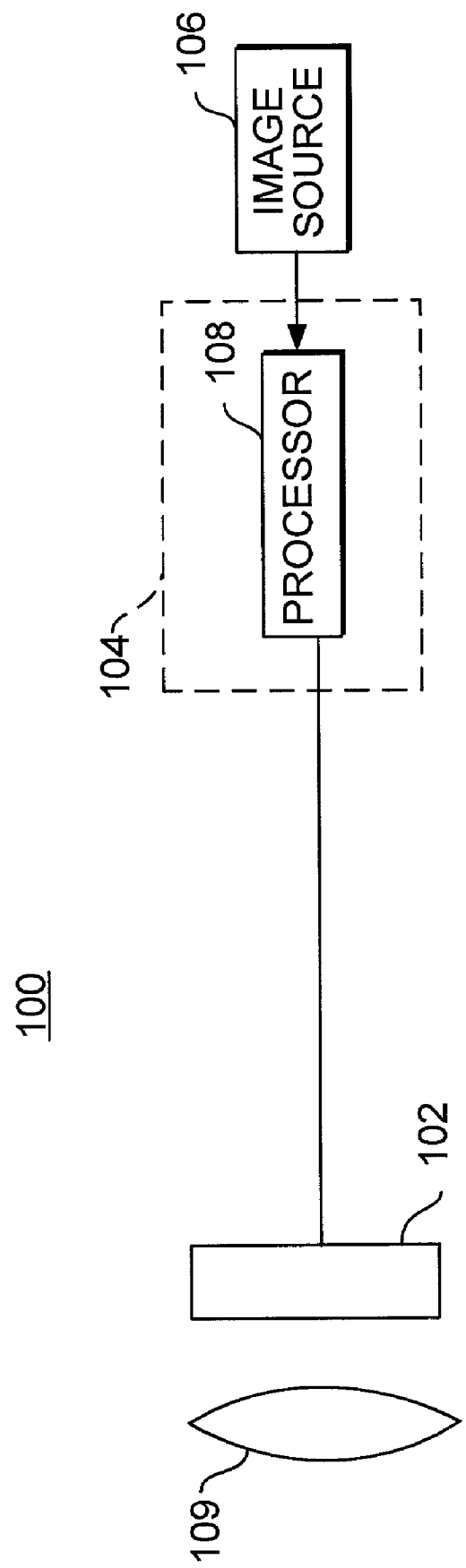

FIG. 1 illustrates a conventional image display system.
FIG. 2 is a schematic diagram of the conventional wearable display system of FIG. 1.
FIG. 3 illustrates a conventional n×n pixel array.
FIG. 4 is a vertical range of vision diagram.
FIG. 5 illustrates regions of varying visual acuity.
FIG. 6 is a schematic diagram of an image display device according to a first embodiment of the present invention.
FIG. 7 illustrates a processor according to the embodiment of FIG. 6.
FIG. 8 illustrates regions of a display.
FIG. 9 is a flow chart illustrating a method of displaying images according to an embodiment of the present invention.
FIG. 10 is a flow chart illustrating the generation of outer region display signals.
FIG. 11 illustrates an alternative arrangement of the inner and outer regions of a display according to an embodiment of the present invention.
FIG. 12 is a schematic diagram of an alternative embodiment of an image display device according to the present invention.
FIG. 13 illustrates an image generated by a display without distortion.
FIG. 14 illustrates an image generated by a display with distortion.
FIG. 15 is a flow chart illustrating a method of displaying images according to an alternative embodiment of the present invention.
FIG. 16 illustrates an image display device for performing the method illustrated by FIG. 15.

DETAILED DESCRIPTION OF PREFERRED EMBODIMENTS

A method and device for displaying images according to the present invention will be described below by way of preferred embodiments and with reference to the accompanying drawings.

A first embodiment of the invention will be discussed with reference to FIG. 6, which is a schematic diagram of an image display device 40 having two displays, each for displaying an image to an eye of a user. The image display device 40 is a wearable display.

The image display device 40 includes a right display 42 and a left display 44, the right display 42 for displaying an image to a right eye 45 of a user, and the left display 44 for displaying an image to the user's left eye 47. A right optics 46 and a left optics 48 can be included to magnify or otherwise adjust the images displayed by the right and left displays 42, 44, respectively. The right and left displays 42, 44 are arranged to receive display signals from a controller 50, which is arranged to receive a source image signal from an image source 58. The controller 50 includes a processor 54, a sampler 56, and an analog-to-digital converter (ADC) 57.

FIG. 7 is a schematic diagram illustrating the processor 54. The processor 54 comprises an address calculator 53 disposed to receive image signal data from the sampler 56, and a right frame buffer 55 and a left frame buffer 59 for receiving formatted image data from the address calculator 53. The elements comprising the controller 50 and the processor 54 are all illustrated as individual elements for the purposes of illustration, however, one or more of these elements can comprise routines or instructions stored on and executable by, for example, a processing unit or units, software and other computer readable media used in conjunction with a computing device, and other devices capable of executing stored instructions.

The image display device 40 may also have audio capability, and an audio signal source 60 can be included to provide source audio signals to the controller 50. Speakers 62, 64 may be arranged to receive audio signals from the controller 50 and to produce audio output from the audio signals. The audio output produced by the speakers 62, 64 can be correlated with the images displayed by the displays 42, 44 in order to create, for example, a desired entertainment program for the user.

As illustrated by FIG. 6, the image source 58 is arranged in the image display device 40 to transmit a source image signal (or signals) to the sampler 56. The image source 58 can be a storage device capable of storing or buffering image data from an image generating source, a camera device for receiving actual images and reducing the images to electronic form, or a combination of the two devices. The term "source image signal" is used in this specification to indicate, for example, a digital or an analog signal containing data capable of describing a series of frames of images. If the source image signal is an analog signal, it can be digitized at the ADC 57 before sampling. Alternatively, the source image signal can be forwarded directly to the sampler 56, and processed in the controller 50 in the analog domain. The sampler 56 samples the source image signal and transmits the image signal data to the processor 54. The processor 54 then converts the image signal data into display signals for display by the right and left displays 42, 44.

According to one aspect of the invention, the right and left displays 42, 44 each include an inner region, and an outer region for generating an image of substantially lower resolution than the inner region. FIG. 8 illustrates an inner region 60, and an outer region 70, of the right display 42. The right display 42 is discussed for the purposes of illustration only, and the left display 44 preferably has a similar configuration.

The inner region 60 may be comprised of a first region 61, a second region 62 of lower resolution than the first region 61, and a third region 63 of lower resolution than the second region 62. The resolution of the regions becomes lower further away from the center of the right display 42, so that the resolution of regions of the image presented by the right display 42 do not exceed the capability of the human eye to appreciate the resolution. The outer region 70 is of substantially lower resolution than the inner region 60, and the image displayed by the outer region 70 may be generated using the motion, brightness, and color characteristics of the image displayed by the inner region 60, so that the image displayed by the outer region 70 is coordinated with the inner region 60.

The first region 61 is of relatively high resolution, and lies in the central field of distinct vision—referred to as the field of "foveal" vision. The foveal field of vision is the generally conical field of view surrounding the line of sight l (see FIG. 4). In human beings, the foveal zone of the retina is used for detailed color and pattern vision. The surrounding peripheral zone is sensitive to grosser features of the outer visual field, with the peripheral area of the retina being especially sensitive to movement. The first region 61, which is of the highest resolution, can be selected to extend over, for example, a 20 degree (10 degrees about the line of sight 1) field of view, so as to generally correspond to the field of foveal vision, while allowing a small amount of eye movement about the center. The inner region 60, can extend over, for example, 40–50 degrees in the user's field of view, and may be expanded or contracted in order to accommodate a desired increase or decrease in the size of the relatively high resolution portion of the image displayed by the inner region 60. The size selected for the zones will depend on the nature of the use for the display. For example, if the image display device 40 is used to display text data, then the inner region 60 would be larger than if a relatively small field of view were of interest.

The second region 62 may have a resolution that is lower than that of the first region 61, and the third region 63 may have a resolution that is lower than that of the second region 62. The first through third regions 61, 62, 63 need not be demarcated at the dividing lines illustrated in FIG. 8, and the right display 42 may instead form a continuous arrangement of individual pixels of substantially continuously increasing size outward from the center of the center of the right display 42. The transition between regions of differing resolution can occur gradually, so that the transition is not noticeable to the user. The indication of first through third regions 61, 62, 63 can therefore be considered as a conceptual aid indicating decreasing resolution as distance from the center of the display increases. The decrease in resolution from the center to the edges of the right display 42 is chosen according to the resolution required for the desired application. Because the eyes' acuity decreases rapidly outward from the line of sight l, for a typical application, it is possible to utilize a resolution along the edge of the inner region 60 that is between $\frac{1}{20}^{th}$ and $\frac{1}{10}^{th}$ of the resolution at the center of the right display 42.

The inner region 60 of the right display 42 can be constructed of a microdisplay capable of displaying, in general, a p×q array of individual pixels. Examples of microdisplays suitable for use in the present invention include liquid crystal displays (LCDs), light emitting displays (LEDs), electro-luminance (EL) displays, electrochromic (EC) displays, and other displays capable of displaying individual pixels. Further, small scanning display devices using CRTs, and laser diodes used to create small displays or write directly on the retina, may also be used. The resolution of microdisplays, as perceived by the eye, may be measured in cycles per degree (CPD). 20:20 vision is defined to be 30 CPD, and 15 CPD equates to 20:40 vision. For a person with 20:20 vision, increasing the CPD of a display above 30 CPD will not produce a measurable improvement in their ability to resolve more detail.

The resolution of the first region 61 is selected to fit the desired application for the image display device 40, and may be, for example, between 15 and 40 CPD near the center of the first region. In the second region 62, the resolution can be in the range of, for example, 5 to 30 CPD. The resolution at the edge of the third region 63 can have a resolution in the range of, for example, 1 to 20 CPD.

The outer region 70 is used to create images that are primarily generated in order to match the characteristics of the edges of the inner region 60. The characteristics preferably include one or more of the motion, color, and brightness of the image displayed in the inner region 60. The movement and brightness need not be exactly matched, and may instead be matched in a "gross" sense, which allows for some discontinuity between the inner region 60 and the outer region 70. The outer region 70 can comprise, for example, a microdisplay as described above, or other illumination devices. However, in the outer region 70, the resolution is substantially lower than that of the inner region. The resolution of the outer region 70 can be less than, for example, 5 CPD, and may be in the range of, for example, 0.05 to 5 CPD. The outer region 70 extends from the outermost edge of the inner region 60, to a maximum field of view of, for example, 100–210 degrees across both eyes, so that a user's entire field of view is occupied by the image displayed.

The outer region 70 can be constructed of arrays of sets of red, blue and green lights ("RGB sets"). The RGB sets can each be used to illuminate an individual point (or "pixel") of the outer region 70. Because of the low resolution of the outer region 70, the RGB sets can be constructed of red, blue and green light bulbs or LED's. These light bulbs produce the visual equivalent to large, marginally delineated pixels, which may be referred to as "diffuse light."

The outer region 70 may also include an array of individually controlled white lights, particularly in the range of a user's peripheral vision. Because the peripheral vision is particularly sensitive to motion, and not to color, white lights in the outer region 70 can convey enough motion information to improve the viewing experience for the user. White lights could, for example, be used within region 70 for this purpose.

The resolution of the outer region 70 can also decrease with distance from the center of the right display 42. For example, the resolution at the outermost edges of the outer region 70 can be within, for example, 0.05 to 1 CPD. At the outermost edge of the right display 42, the resolution can be as low as 0.05 CPD, as this part of the display may correspond to the eye's most extreme peripheral vision.

The operation of the embodiment of FIGS. 6–8 will now be discussed with reference to FIG. 9. FIG. 9 is a flow chart illustrating a method of displaying images according to an embodiment of the present invention. According to the method of operation of the image display device 40, the controller 50 generates an inner region display signal using a source image signal, and generates an outer region display signal using the inner region display signal by determining, for example, one or more of the motion, brightness or color characteristics from the inner region display signal. The inner and outer region display signals are then used to display inner and outer regions of an image, respectively.

In step S10, the image source 58 transmits a source image signal to the controller 50. The sampler 56 samples the source image signal in step S12, and transmits the image signal data sampled from the source image signal to the processor 54.

In step S14, the processor 54 generates inner region display signals for both the right display 46 and the left display 48 using the image signal data sampled in step S12. The processor 54 generates the inner region display signals by forwarding the sampled image signal data to the address calculator 53 (see FIG. 7) and transmitting formatted right and left, inner region display data to the right and left frame buffers 55, 59, respectively. In this manner, a right inner region display signal is stored in the right frame buffer 55 for eventual display in the inner region 60 of the right display 42, and a left inner region display signal is stored in the left frame buffer 59 for display by an inner region (not illustrated) of the left display 44.

The right and left inner region display signals generated in step S14 can be adapted for display on displays having an inner region 60 of, for example, first, second, and third regions 61, 62, 63 of differing resolution as illustrated by FIG. 8. Alternatively, the right and left inner region display signals can be adapted for display on displays having an inner region of uniform resolution.

In step S16, the processor 54 generates a right outer region display signal for display by the outer region 70 of the right display 42, and a left outer region display signal for display by an outer region (not illustrated) of the left display 44. The method for generating the right outer region display signal and the left inner region display signal is discussed below in detail with reference to FIG. 10.

In step S18, a right display signal is transmitted to the right display 42, the right display signal being formed by the right inner image display signal and the right outer image display signal. Similarly, the left display signal is transmitted to the left display 44, the left display signal being formed by the left inner image display signal and the left outer image display signal. The right and left display signals are displayed on the right and left displays 42, 44, respectively, in step S20.

FIG. 10 illustrates the steps involved in generating outer region display signals, in particular the right outer region display signal, as recited in step S16 of FIG. 9. The following discussion is addressed to the right outer region display signal for illustrative purposes. The left outer region display signal may be generated in a manner similar to the right outer region display signal, using the left inner region display signal. In step S24, the processor 54 detects the motion, brightness, and color of an image to be displayed from the right inner region display signal. The right outer region display signal is then generated so that motion, brightness, and color of an image to be displayed by the outer region 70 are imparted with the motion, brightness and color of an image to be displayed by the inner region 60.

The sense of motion conveyed by the right inner region display signal may be detected by an algorithm such as those used for creating MPEG motion vectors. The right outer region 70 is of substantially lower resolution than the right inner region 60, and the sense of motion from the right inner region 60 can be imparted to the lower resolution right outer region 70 by mapping current and extrapolated motion information into the outer display regions by predetermined information in the signal source, or predicted information from the motion vectors that is extended into the outer display regions. The brightness and color conveyed by the inner region display signal may be detected by analysis of the image information near the edges of the image, and combining this information with motion vectors when broad movement (e.g. panning) is detected. The brightness and color of the right inner region 60 can be imparted to the lower resolution right outer region 70 by generating illuminator control signals based on the analysis of brightness and color information in the original image information. Using the above operations, a right outer region display signal can be generated that will generate an image in the outer region 70 of the right display 42 of substantially lower resolution than the inner region 60 of the right display 42, but that is imparted with the motion, brightness and color of the inner region.

The left outer image display signal can be generated in a manner similar to the right outer image display signal, by detecting the motion, brightness and color characteristics of the left inner image display signal.

In step S28, the left and right outer region image display signals is blended with their respective inner region image display signals so that the right image and the left image appear to be continuous across the right and left displays 42, 44. This may be referred to as creating a relatively continuous, or "soft" transition zone between the inner and outer regions of the right and left displays. For example, the right inner region image display signal can be blended with the right outer region image display signal by using interpolation or averaging algorithms to blur pixels in region 63, creating more blur in pixels near the region 70 than in the region 62. The left outer region image display signal can be similarly blended with the left inner region image display signal.

Alternatively, the inner and outer regions may be blended by optics after the right and left images are displayed by the right and left displays 42, 44. Referring to FIG. 6, the right optics 46 can be adapted to "smear" or "blur" adjacent edges of the inner and outer regions so that the outer regions appear to blend more smoothly with the inner regions of the right and left displays 42, 44.

In addition to electronic and/or optical blending, the right and left images may be enhanced by a leaving a gap between the inner region 60 and the outer region 70 of the right display 42. The left display 44 may similarly include a gap between its inner and outer regions. The gap allows the user to focus on the inner region of a display and to not have the inner region image degraded by the nearby presence of the outer region of substantially lower resolution. The gap may be, for example, between 2 and 20 degrees in width.

After adjusting the inner and outer images in step S28, the processor 54 then transmits formatted image data values from the inner and outer image signals to a respective one of the right and left frame buffers 55, 59 in step S30.

The above discussion is discussed in general terms with reference to a right display 42 and a left 44 display of varying resolution. The present invention, however, is not restricted to display panels, or "microdisplays" having a specified number of pixels that create an image when illuminated. The present invention also encompasses displays created by transmissive or reflective LCD's, electroluminescent, plasma, LED, and flat CRT's that create either virtual or projected images to the eye. Further, small scanning display devices using CRTs, and laser diodes used to create small displays, or to write directly on the retina, may also be used.

FIG. 11 illustrates an arrangement of regions of a display 75, according to an alternative embodiment of the present invention.

The display 74 includes first, second and third regions 76, 77, 78, with the resolution of the first through third regions 76, 77, 78 decreasing outwardly from a center 75 of the display 74. The first through third regions 76, 77, 78 may have a configuration similar to the first through third regions 61, 62, 63 of the right display 42 illustrated in FIG. 8. An outer region of the display 74 includes a right outer region 80 and a left outer region 82.

FIG. 12 is a schematic diagram of an alternative embodiment of an image display device 90 according an embodiment of the present invention.

The image display device 90 comprises a display 92 and a controller 94 which includes a processor 95. Optics 98 may be included to modify the images displayed by the display 92. An image source 96 is coupled to the processor 95 to provide a source image signal. The image display device 90 operates in a manner similar to the image display device 40, except that only a single display 92 is used to create an image for viewing by a user.

The image display device 90 utilizes a display having inner and outer regions, such as the displays 42 and 74 illustrated by FIGS. 8 and 11, respectively, or other display configurations utilizing an inner region and an outer region of substantially lower resolution.

The above embodiments discuss methods in which an image having a wide field of view is displayed from an inner region and an outer region of low resolution. FIGS. 13–16 illustrate an alternative method of expanding the field of view of a display using distortion of the edges of a display. Distorting the edges of an image allows an image to fill an outer region of a display having lower resolution than an inner region of the display.

According to the embodiment illustrated by FIGS. 13–16, a display signal is adapted to present an image with distortion along the edges of the display. The distortion may be introduced during processing of the image display signal. The embodiment illustrated by FIGS. 13–16 can be practiced on an image display device 40 as illustrated by FIG. 6, or on an image display device 90 as illustrated by FIG. 12. In the present embodiment, however, image data from the source image signal is adjusted so that an image displayed using the image data is distorted at the edges of the display, thereby expanding the field of view of the display into an outer region of a display.

FIG. 13 illustrates an image as it would appear on an image display 110 without using distortion. FIG. 14 illustrates an image similar to the image of FIG. 13, displayed on a larger display 102, with a distorted region 124 of the image being extended, or "stretched" to fill the larger display 102.

As illustrated by FIGS. 13 and 14, an inner region 122 of the image on the display 102 generally corresponds to the inner region 112 of the image displayed on the display 110. The outer region 124 displayed by the display 102, however, extends the field of view of the image of the display 102 so that it is larger than the image presented by the display 110. Because the outer region 124 is produced from distorted image data, the resolution of the outer region is lower than that of the inner region 122. The outer region 124, however, retains the motion, brightness, and color characteristics of a source image signal. Because the human eye is less sensitive to detailed color and pattern vision in the outer region 124, the image presented to the user is enhanced, without sacrificing the sense of clarity conveyed to the user.

FIG. 15 is a flow chart illustrating a method of displaying images according to the embodiment of the invention illustrated by FIG. 14. The method of displaying images illustrated by FIG. 15 will be discussed with reference to an image display device 100 illustrated by FIG. 16.

In step S70, an image source 106 transmits a source image signal to a processor 108 of a controller 104. The processor 108 then samples the source image signal in step S72, and determines how the data sampled from the source image signal is to be distorted in step S74. For example, the source image signal may be sampled so that an image signal corresponding to the image of FIG. 13 is suitable for display on a display 110. In step S75, the controller 104 adjusts the sampled image signal data so that an image signal corresponding to the image of FIG. 14 can be generated in step S76. One method of distortion would be to distort, for example, the outer 15 to 50 degrees of field of view of an image such that the image extended to cover, for example, 20 to 90 degrees about the line of sight 1. The distortion could become more pronounced with distance from the center of the display 102, where the eye's acuity is lower. For example, in the outer region 124, near the edge of the inner region 122, the distortion ratio between the outer region 124 and the inner region 122 could be between, for example, 1:1 and 10:1, and could increase to between 2:1 and 20:1 near the outermost edge of the outer region 124.

In step S76, the controller 104 generates a display signal using the adjusted image data, which is transmitted to the display 102 in step S78. The display 102 displays the image in step S80.

The sampled image signal data can also be distorted by, for example, microdisplay panels that photolithographically distort the image, and mechanical scanning devices.

The outer region 124 of the display 102 can be of substantially lower resolution than the inner region 122. For example, displays such as those illustrated by FIGS. 8 and 11 can be used in the image display device 110. In this case, the outermost edges of the image illustrated by FIG. 14 would be displayed by the outer regions of the displays of FIGS. 8 and 11.

According to the embodiment illustrated by FIGS. 13–16, the outer region of the source image may be selected so that it lies outside of the eyes' foveal field of view, so that the distortion does not detract from the user's viewing experience. The viewing experience is enhanced by the increased size of the image displayed by the display 102.

As an alternative to distorting the image signal data in order to obtain a display signal, a distorted image can be obtained by utilizing optics, such as the optics illustrated in FIG. 16. For example, the optics 108 in the image display device 100 can be configured to create the distortion of the image of FIG. 13 so that it is distorted in the general manner illustrated by FIG. 14.

In this embodiment, a nondistorted display signal is transmitted to the display 102, and the optics 108 distort the image presented to the user by magnifying edge regions of the image from the display to a greater degree than the inner portion of the image. For example, in the foveal region (0–20 degrees field of view), the magnification can be relatively uniform. The magnification can increase progressively, outwardly from the foveal region, so that at the outermost regions of the image, the distortion ratio is between, for example, 2:1 to 20:1.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A method of displaying frames of images comprising:
   generating an inner region display signal of the frame of an image;

determining at least one of a notion or color characteristic from the inner region display signal;

generating an outer region display signal of the frame of the image using the at least one motion or color characteristic;

displaying an inner region of the frame of the image on a display using the inner region display signal; and displaying an outer region of the frame of the image on the display using the outer region display signal, wherein the outer region of the display is of substantially lower resolution than the inner region.

2. The method of claim 1, wherein generating an outer region display signal further comprises:

adjusting the outer region display signal so that the outer region of the frame of the image blends with the inner region of the frame of the image.

3. The method of claim 1, wherein displaying an outer region of the frame of the image further comprises:

displaying an outer region of less than 5 cycles per degree resolution.

4. The method of claim 3, wherein displaying an inner region of the frame of the image further comprises:

displaying a center of the inner region of at least 15 cycle per degree resolution.

5. The method of claim 3, wherein displaying an outer region of the frame of the image further comprises:

illuminating an array of red, blue and green lights.

6. The method of claim 1 wherein displaying an outer region of the frame of the image further comprises illuminating an array of white lights.

7. The method of claim 1, wherein displaying an outer region of the frame of the image further comprises:

shining red, blue and green lights into a user's field of view.

8. A wearable display, comprising:

a display comprising a plurality of pixels, the display having an inner region and an outer region of substantially lower resolution than the inner region; and a controller operably coupled to the display, wherein the controller generates an inner region display signal, and an outer region display signal using at least of one of a motion, brightness or color characteristic from the inner region display signal.

9. The display of claim 8, wherein the outer region is of less than 5 cycles per degree resolution.

10. The display of claim 8, wherein the inner region is of at least 15 cycle per degree resolution at a center of the inner region.

11. The display of claim 9, wherein the outer region comprises: an array of red, blue and green lights.

12. The display of claim 8 wherein the outer region comprises an array of white lights.

13. A method of displaying images using a wearable display, comprising:

determining an amount of distortion for image signal data, the distortion acting to distort a source image conveyed by the image signal data so that a field of view of the source image is expanded;

adjusting the image signal data so that the source image conveyed by the image signal data is distorted according to the determined amount of distortion;

generating a display signal using the adjusted image signal data; and displaying a distorted image on a display by using the display signal.

14. The method of claim 13, wherein the step of adjusting the image signal data comprises:

creating a distortion ratio between an inner region and an edge of the source image of between 2:1 and 20:1.

15. The method of claim 14, comprising:

sampling a source image signal to obtain the image signal data.

16. A wearable display, comprising:

a display for displaying images;

a controller operably coupled to the display, wherein the controller obtains image signal data from a source image signal and generates a display signal for display by the display; and optics arranged in the wearable display, wherein the optics modify an image displayed by the display by distorting an outer region of the image by a greater amount than an inner region of the image so that a field of view of the image is increased.

17. The wearable display of claim 16, wherein a distortion ratio between a portion of the outer region and a portion of the inner region is between 2:1 and 20:1.

18. An apparatus comprising:

a display device comprising having an inner region and an outer region of substantially lower resolution than the inner region; and a controller coupled to the display device, wherein the controller generates an inner region display signal that couples to the inner region, and an outer region display signal that couples to the outer region.

19. The apparatus as defined in claim 18 wherein the controller uses at least of one of a motion, brightness or color characteristic from the inner region display signal to generate the outer region display signal.

20. The apparatus as defined in claim 18 further comprising:

wherein the inner region of the display device comprises a plurality of pixels; and wherein the outer region of the display device comprises an array of white lights.

21. The apparatus as defined in claim 18 further comprising:

wherein the inner region of the display device comprises a plurality of pixels; and wherein the outer region of the display device comprises an array red, green and blue lights.

22. The apparatus as defined in claim 18 wherein the display device is a wearable display device.

* * * * *

UNITED STATES PATENT AND TRADEMARK OFFICE
CERTIFICATE OF CORRECTION

PATENT NO. : 7,081,870 B2  
APPLICATION NO. : 09/851340  
DATED : July 25, 2006  
INVENTOR(S) : Barry Bronson Page 1 of 1

It is certified that error appears in the above-identified patent and that said Letters Patent is hereby corrected as shown below:

In column 5, line 22, delete "sight 1" and insert -- sight 1 --, therefor.

In column 11, line 1, in Claim 1, delete "notion" and insert -- motion --, therefor.

In column 12, line 54, in Claim 21, after "array" insert -- of --.

Signed and Sealed this

Fifth Day of May, 2009

JOHN DOLL  
*Acting Director of the United States Patent and Trademark Office*